UNITED STATES PATENT OFFICE.

ARNOLD SCHEDLER, OF BASEL, SWITZERLAND, ASSIGNOR TO SOCIETY OF CHEMICAL INDUSTRY IN BASLE, OF BASEL, SWITZERLAND.

RED DISAZO DYE AND PROCESS OF MAKING SAME.

943,470.

Specification of Letters Patent. Patented Dec. 14, 1909.

No Drawing.

Application filed April 28, 1909. Serial No. 492,629.

*To all whom it may concern:*

Be it known that I, ARNOLD SCHEDLER, chemist and doctor of philosophy, a citizen of the Swiss Republic, and resident of Basel, Switzerland, have invented new and useful Red Disazo Dyestuffs and a Process for the Manufacture of the Same, of which the following is a full, clear, and exact specification.

It has been found, that new valuable disazo-dyestuffs can be obtained by diazotizing the mono-azo-dyestuffs of the general formula

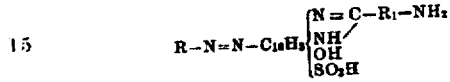

(derived from one molecule of a monodiazo compound and one molecule of an aminoaryl-1:2-naphthimidazol 5-oxy-7-sulfonic acid) and combining the resulting diazo-azo compound with one molecule of an aminoaryl-5-pyrazolone-3-carboxylic and

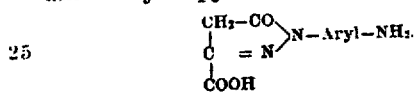

These new dyestuffs constitute in dry state red to reddish-brown powders which dissolve in water with yellowish-red to bluish-red coloration and dye unmordanted cotton clear yellowish-red to bluish scarlet-red tints. By diazotation on the fiber and subsequent development with beta-naphthol they yield valuable red tints, which besides their good fastness to acids distinguish themselves by a great fastness to washing.

The process for the manufacture of the new dyestuffs is illustrated by the following examples:

Example I: 12.1 kilos of para-xylidin are dissolved in 200 liters of water by adding 25 kilos of concentrated hydrochloric acid and diazotized, while cooled with ice, with 7 kilos of sodium nitrite, whereupon the diazo-solution is poured into an alkaline solution of 36 kilos of meta-aminophenyl-1:2-naphthimidazol-5-oxy-7-sulfonic acid. The combination is effected after a short time. The mass is then first neutralized with hydrochloric acid and an excess of 30 kilos of concentrated hydrochloric acid having afterward been added, a solution of 7.5 kilos of sodium nitrite is allowed to run in at a temperature of about 15-20° C. The diazotization is accomplished after stirring during two hours. The thus obtained diazoazo compound is introduced into an alkaline solution of 22 kilos of meta-aminophenyl-5-pyrazolone-3-carboxylic acid, the whole is boiled up and the dyestuff is completely salted out, filtered, pressed and dried. The dyestuff obtained constitutes in dry state a brown-red powder, which dissolves in water with a bluish-red coloration. Its direct dyeings on unmordanted cotton show scarlet-red tints, which become very fast to washing, when diazotized on the fiber and developed with beta-naphthol.

Example II: 22.3 kilos of 2:8naphthylamin-sulfonic acid are diazotized in the usual manner and combined with 36 kilos of meta-aminophenyl-1:2-naphthimidazol-5-oxy-7-sulfonic acid. The resulting monoazo-dyestuff is then diazotized in the manner described in Example I and the resulting diazo-azo compound is introduced in an alkaline watery solution of 22 kilos of meta- or para-amino-phenyl-5-pyrazolone-3-carboxylic acid. The dyestuffs thus obtained yield on cotton bluish-red tints, which become fast to washing by further diazotization on the fiber and development with beta-naphthol.

In the foregoing examples the xylidin and the 2:8-naphthylamin-sulfonic acid may be replaced by other amins or their substitution products. For instance anilin, anilin-meta-sulfonic acid and anilin-para-sulfonic acid give yellowish-red, anisidin, toluidin, chloranilin, para-aminoactanilid, beta-naphthylamin and 2:6 or 2:5-naphthylamin-sulfonic acid scarlet-red to blue-red shades. Further instead of the monoazo-dyestuffs derived from meta-amidophenyl-1:2-naphthimidazol-5-oxy-7-sulfonic acid there may also be used the corresponding dyestuffs deriving from the para-amidophenyl-1:2-naphthimidazol-5-oxy-7-sulfonic acid, which yields, by its combination with amidophenyl-pyrazolone-carboxylic acid, disazo-dyestuffs of much bluer shades.

What I claim is:

1. The herein described process for the manufacture of red disazo-dyestuffs, which consists in first diazotizing the monoazo-dyestuff, obtained by the combination of one molecule of an aminoaryl-1:2-naphthimidazol-5-oxy-7-sulfonic acid with one molecule of a monodiazo compound and subsequently combining the thus obtained diazo-azo compound with one molecule of an aminoaryl-5-pyrazolone-3-carboxylic acid.

2. The herein described process for the manufacture of red disazo-dyestuffs, which consists in first diazotizing the monoazo-dyestuff resulting from the combination of one molecule of an aminophenyl-1:2-naphthimidazol-5-oxy-7-sulfonic acid with one molecule of a monodiazo compound and combining subsequently the thus obtained diazo-azo derivative with one molecule of an aminophenyl-5-pyrazolone-3-carboxylic acid.

3. As new products, the red disazo-dyestuffs, which may be obtained by diazotizing the monoazo-dyestuff, resulting from the combination of one molecule of an aminophenyl-1:2-naphthimidazol-5-oxy-7-sulfonic acid with one molecule of a mono-diazo compound and combining the thus obtained diazo-azo derivative with one molecule of an aminophenyl-5-pyrazolone-3-carboxylic acid, the said disazo-dyestuffs constituting in dry state red to brown-red powders, soluble in water with a yellowish red to blue-red coloration and dyeing unmordanted cotton clear yellow-red to blue-red shades, yielding by further diazotizing on the fiber and subsequent development with beta-naphthol valuable red tints fast to washing.

In witness whereof I have hereunto signed my name this 16th day of April 1909, in the presence of two subscribing witnesses.

ARNOLD SCHEDLER.

Witnesses:
 GEO. GIFFORD,
 AMAND RITTER.